Oct. 25, 1955     F. B. AUBERT     2,721,721
MOTOR OPERATED GAS VALVE
Filed Jan. 26, 1949
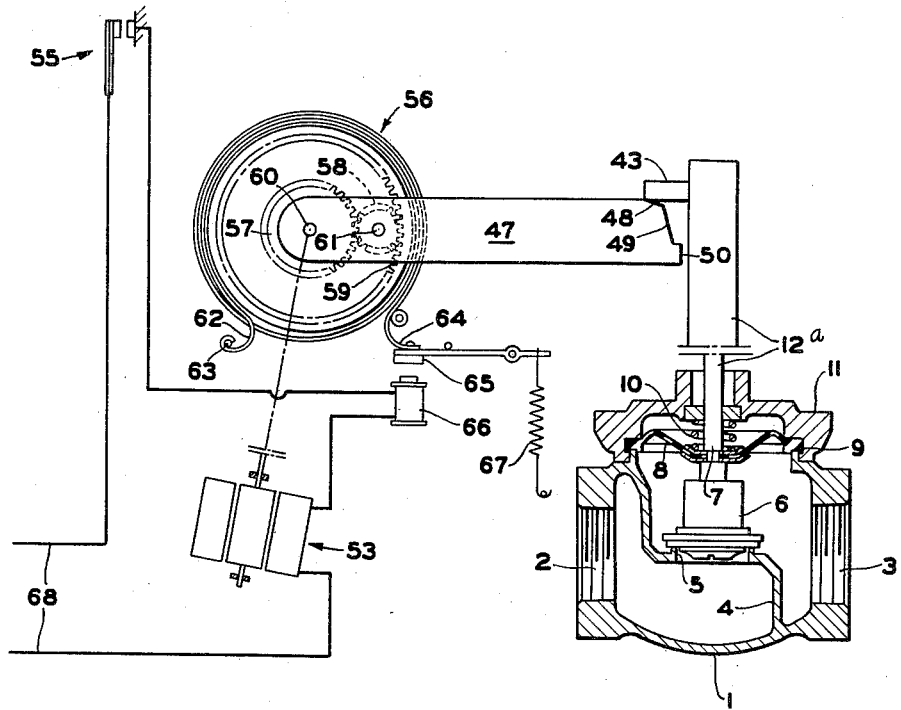
INVENTOR.
Fred B. Aubert
BY
Andrew K. Fouls
his ATTORNEY United States Patent Office 2,721,721
Patented Oct. 25, 1955

2,721,721

MOTOR OPERATED GAS VALVE

Fred B. Aubert, Detroit, Mich.

Application January 26, 1949, Serial No. 72,957

12 Claims. (Cl. 251—134)

This invention relates generally to new and useful improvements in automatically operated valves and more particularly to motor operated valves for controlling flow of gas to gas burners.

It is well known in the art of automatic gas valves that for maximum efficiency and safety in operation it is desirable that the valve open rapidly on initial opening movement and that the remainder of opening movement be at a slower rate. This quick initial opening and slower subsequent opening movement prevents "flash back" upon ignition of gas at the burner.

Accordingly, it is one of the objects of this invention to provide a new and improved automatically operated valve.

Another object is to provide an automatically operated gas valve having an improved means for providing a quick initial opening movement and a slower subsequent movement.

Another object is to provide an improved motor operated gas valve having a means for providing a quick initial opening movement and a slower subsequent movement.

Another object is to provide an improved motor operated gas valve which is simply constructed, easily operated, and inexpensive to manufacture.

Other objects will become apparent from time to time throughout the specification and claims as hereinafter related.

This invention comprises the new and improved construction and combination of parts and their cooperative relationship to each other, to be described more fully hereinafter, and the novelty of which will be particularly pointed out and distinctly claimed.

In the accompanying drawings, to be taken as a part of this specification, there are clearly and fully illustrated three preferred embodiments of this invention, in which drawings:

The single figure is a view in vertical cross section of a valve casing and valve operating member and showing diagrammatically the valve operating mechanism and electric circuits therefor of one form of this invention.

Referring to the drawings by characters of reference, there is shown in the figure a valve casing 1 having an inlet 2 and an outlet 3. Within the casing 1 there is an internal wall or partition 4 having an aperture or valve port 5 therethrough. There is a valve member 6 having a valve stem 7 and which is cooperable with the port 5 to control flow of gas through the valve. The valve is sealed against gas leakage by a diaphragm 8 which surrounds the valve stem 7 and which has its outer periphery sealed in the wall of the casing 1 around its top portion as indicated at 9. There is a spring 10 which is positioned between the diaphragm 8 and top wall 11 of the casing 1 and which is operable to urge the valve member 6 toward a closed position.

The valve stem 7 has a portion 12ª which extends outside the valve casing through an aperture in the casing top wall 11. The valve stem portion 12ª has an abutment 43 thereon by which the valve is operated. A lever means or member 47 is provided with a cam surface cut thereon which cam surface is engageable with the abutment 43 on lever movement to move the valve member 6 to open position. The cam surface on the lever 47 comprises a steep portion 48 and a portion 49 of lower slope relative to the direction of valve lift which cam surface terminates in a limit or stop member 50.

There is provided a planetary gear structure 56 comprising a sun gear 57, a planet gear 58, and an internal gear 59 for operating the lever 47. The lever 47 is pivoted as at 60 on the shaft of the sun gear 57 and is pivotally connected to the shaft 61 of the planet gear 58. There is a brake strip or wire 62 (or other braking means) which is secured at one end as at 63 and which is looped one or more times around the drum surface of the internal gear 59. The other end 64 of the strip 62 is secured to a movable magnetic armature 65 which armature is movable by an electromagnet 66. A spring 67 urges the armature 65 away from the magnet 66. An electric motor 53 is provided for driving the planetary gear structure 56 for opening the valve. The motor 53 is a constant speed motor of the type which may be completely stopped or stalled during operation without burning out or causing other damage. As illustrated, the motor 53 is energized by a simple series electric circuit which includes the electromagnet 66, a room thermostat 55, as well as the power source 68.

The operation of this form of the invention is as follows: When the room thermostat 55 closes, calling for heat, the circuit through the motor 53 and electromagnet 66 is energized. The motor 53 then begins to rotate the sun gear 57 and planet gear 58. Substantially simultaneously the electromagnet 66 pulls down the armature 65 and tensions the brake strip 62 which prevents the internal gear 59 from rotating and establishes a driving engagement of the gears. With the internal gear 59 restrained from movement the rotation of the sun gear 57 will cause the planet gear 58 to rotate about the sun gear thereby rotating the lever 47 (in a counterclockwise direction) to move the valve stem 12ª. Although the gears of this structure are continuously engaged a "driving engagement" is effected only when one of them is restrained to cause movement of the others.

The counter-clockwise rotation of the lever 47 will cause the steep cam surface 48 to engage the abutment 43 and move the valve stem 7 and valve member 6 upward with a quick initial movement. When the lever 47 rotates further so that the cam surface 49 is engaging the abutment 43, the rate of valve opening will be reduced for the remainder of the valve opening movement, thus providing for a two-stage opening of the valve. This quick initial opening of the valve followed by a subsequent slower opening to full position prevents the occurrence of "flash back" from the burner which is well understood in the art. When the lever 47 rotates further, the stop member 50 is brought into engagement with the abutment 43. This engagement by the stop member 50 so increases the load that the motor 53 is stalled and the valve member 6 held at its limit of opening movement.

As an alternate form of operation the braking force of the brake strip 62 when tensioned by the electromagnet 66 could be adjusted to permit the internal gear 59 to slip when the increased load is applied by engagement of the lever stop portion 50 and the valve stem abutment 43. This slippage would permit the motor 53 to continue operation without stalling but would maintain the lever 47 in a valve open position. When the thermostat 55 opens, de-energizing the motor and electromagnet the driving engagement of the gears is released and the lever 47 is moved by the valve spring 10 to closed position rotating the internal gear 59 and planet gear 58 about the sun gear 57 without pulling against the internal friction of the motor. It should be noted that although the lever 47 is shown and described as being connected to the sun gear and the planet gear it could be connected to any two of the gears which might produce the desired pivotal movement.

It has been found in the art of automatically operated gas valves that with many types of burners it is highly desirable that the valve close at a rate of speed which is neither too fast nor too slow. If the valve is closed very slowly, as in heat motor operated valves taking from 30 seconds to as much as 2 minutes for closing, the heating cycle is disrupted and a condition of "hunting" or "overshooting" may arise on the heating cycle. On the other hand, if the valve is closed very rapidly, as in solenoid valves which may close in ⅓ of a second or less, the flame in the gas burner tends to go out with a "puff" which frequently blows out the pilot flame.

It will be appreciated that in the form of invention shown and described the force of the spring 10 which closes the valve is determined according to the frictional resistance of the gear mechanism 56 so that the valve may close at a predetermined rate which is neither too fast nor too slow, thereby preventing a "puff" in the burner as has just been described. One preferred valve closing rate is approximately one second.

Having thus described the invention what is claimed and is desired to be secured by Letters Patent of the United States is:

1. In a device of the character described, a movable member, means biasing said movable member in one direction, a planetary gear structure comprising a sun gear, a planet gear, and an internal gear, lever means separate from said movable member and engageable therewith, said lever means operable to move said movable member in the opposite direction, said lever means having a pivot at one point and being connected to one of said gears at another point for pivotal movement thereby, means engageable with one of the other of said gears and operable to restrain the same from rotary movement thereby to cause said one gear to have pivotal movement relative to said lever means pivot, electric driving means operable to move said one gear, and means to render said engageable means effective upon energization of said driving means and ineffective upon deenergization of said driving means said biasing means being operable to act through said movable member to move said lever means and restore said one gear and said lever pivot means to their initial relationship upon de-energization of said driving means.

2. In a device of the character described, a movable member, means biasing said movable member in one direction, a planetary gear structure comprising a sun gear, a planet gear, and an internal gear, lever means separate from said movable member and engageable therewith, said lever means operable to move said movable member in the opposite direction, said lever means having a pivot at one point and being connected to one of said gears at another point for pivotal movement thereby, means engageable with one of the other of said gears and operable to restrain the same from rotary movement thereby to cause said one gear to have pivotal movement relative to said lever means pivot, electric driving means operable to move said one gear, means to render said engageable means effective upon energization of said driving means and ineffective upon deenergization of said driving means, said biasing means being operable to act through said movable member to move said lever means and restore said one gear and said lever pivot means to their initial relationship upon deenergization of said driving means, and means to stop further pivotal movement of said one gear upon predetermined movement of said movable member in the opposite direction.

3. In a device of a character described, a movable member biased in one direction to an initial position, an abutment on said movable member, a lever having at one end a cam track engageable with said abutment and operable upon pivotal movement to move said movable member in the opposite direction, said cam track having a first portion operable to cause initial movement of said movable member to be at a predetermined high rate of speed and a second portion operable to cause subsequent movement to be at a predetermined lower rate of speed, said cam track terminating at a stop portion on said lever, a planetary gear structure comprising a sun gear, a planet gear, and an internal gear, said lever having a pivot at one point and being connected at another point to one of said gears for pivotal movement thereby, an electrically operated brake engageable with one of the other of said gears and operable to restrain the same from movement thereby to cause said one gear to move said lever pivotally to move said movable member in the opposite direction, an electric motor for driving one of said unrestrained gears, said motor being so constructed that it may be stalled under load without burning out, said electrically operated brake being connected to be energized only when said motor is energized, said lever stop portion being operable upon engagement with said movable member abutment to increase the load on said motor as to cause it to stall, said motor and said gear structure being operable to hold said lever against the bias of said movable member while stalled, and said brake being deenergized upon deenergization of said motor to permit said one gear to be rotated by the biasing force of said movable member to restore said movable member, said one gear and said lever to their initial positions without rotating said motor.

4. In a device of a character described, a movable member biased in one direction to an initial position, an abutment on said movable member, a lever having at one end a cam track engageable with said abutment and operable upon pivotal movement to move said movable member in the opposite direction, said cam track having a first portion operable to cause initial movement of said movable member in the opposite direction to be at a predetermined high rate of speed and a second portion operable to cause subsequent movement to be at a predetermined lower rate of speed, said cam track terminating at a stop portion on said lever, a planetary gear structure comprising a sun gear, a planet gear, and an internal gear, said lever being pivoted to the shaft of said sun gear and being secured to said planet gear for pivotal movement thereby, a brake strip secured at one end against movement and looped about said internal gear for braking engagement therewith, an electromagnetic coil having a movable armature cooperable therewith, said armature being secured to the other end of said brake strip and operable upon energization of said coil to tighten said strip to restrain said internal gear from movement, an electric motor coupled to said sun gear for rotating the same, said sun gear being operable upon rotation when said internal gear is restrained to rotate said planet gear thereabout within said internal gear and thereby to pivot said lever, said motor being so constructed that it may be stalled under load without burning out, said lever stop portion being operable upon engagement with said movable member abutment to increase the load on said motor as to cause it to stall, said motor and said gear structure being operable while stalled to hold said lever against the bias of said movable member, said coil being electrically connected to be energized upon energization of said motor and deenergized upon deenergization of the same, and said internal gear and said planet gear being operable to rotate about said sun gear in response to the bias of said movable member to move said movable member to its initial position upon release of said brake strip.

5. In a device of a character described, a movable member biased in one direction to an initial position, an abutment on said movable member, a lever having at one end a cam track engageable with said abutment and operable upon pivotal movement to move said movable member in the opposite direction, said cam track having a first portion operable to cause initial movement of said movable member in the opposite direction to be at a predetermined high rate of speed and a second portion operable to cause subsequent movement to be at a predetermined lower rate of speed, said cam track terminating at a stop portion on said lever, a planetary gear structure comprising a sun gear, a planet gear, and an internal gear, said lever having a pivot at one point and being connected at another point to one of said gears for pivotal movement thereby, an electrically operated brake engageable with one of the other of said gears and operable to restrain the same from movement thereby to cause said one gear to move said lever pivotally to move said movable member, an electric motor for driving one of said unrestrained gears, said motor being operable upon predetermined increase in the load on said lever to cause said one other gear to slip relative to said brake, said lever stop portion being operable upon engagement with said movable member abutment to increase the load on said motor as to cause said one other gear to slip, said motor and said gear structure being operable to hold said lever against the bias of said movable member while operating under said increased load, and said brake being electrically connected to be deenergized upon deenergization of said motor, said movable member being operable under its biasing force to rotate said one gear and return said one gear and said operating lever to their initial position relative to each other and said movable member without rotating said motor.

6. In a device of the character described, a movable member biased in one direction to an initial position, an abutment on said movable member, a lever having at one end a cam track engageable with said abutment and operable upon pivotal movement to move said movable member in the opposite direction, said cam track having a first portion operable to cause initial movement of said movable member to be at a predetermined high rate of speed and a second portion operable to cause subsequent movement to be at a predetermined lower rate of speed, said cam track terminating at a stop portion on said lever, a planetary gear structure comprising a sun gear, a planet gear, and an internal gear, said lever being pivoted to the shaft of said sun gear and being secured to said planet gear for pivotal movement thereby, a brake strip secured at one end against movement and looped about said internal gear for braking engagement therewith, an electromagnetic coil having a movable armature cooperable therewith, said armature being secured to the other end of said brake strip and operable upon energization of said coil to tighten said strip to restrain said internal gear from movement, an electric motor coupled to said sun gear for rotating the same, said sun gear being operable upon rotation when said internal gear is restrained to rotate said planet gear thereabout within said internal gear and thereby to pivot said lever, said motor being operable upon predetermined increase in the load on said lever to cause said one other gear to slip relative to said brake strip, said lever stop portion being operable upon engagement with said abutment to increase the load on said motor as to cause said internal gear to slip, said motor and said gear structure being operable while operating under said increased load to hold said lever against the bias of said movable member, said coil being electrically connected to be energized upon energization of said motor and deenergized upon deenergization of the same, and said movable member being operable under its biasing force to rotate said internal gear and said planet gear about said sun gear to return said operating lever and said planet gear to their initial position relative to said sun gear upon release of said brake strip.

7. In an automatically operated device, a movable member, means biasing said movable member in one direction, a planetary gear structure comprising a sun gear, a planet gear, and an internal gear, lever means separate from said movable member and engageable therewith, said lever means operable to move said movable member in the opposite direction, said lever means being pivoted on the shaft of said sun gear and being connected to said planet gear for pivotal movement thereby, means engageable with said internal gear and operable to restrain the same from movement thereby to cause said planet gear to rotate about said sun gear upon rotation of said sun gear, electric driving means for rotating said sun gear, and means to render said engageable means effective upon energization of said driving means and ineffective upon deenergization of said driving means, said biasing means being operable to act through said movable member to return said lever means and said planet gear to their initial position relative to said sun gear upon de-energization of said driving means.

8. In an automatically operated device, a movable member, means biasing said movable member in one direction, a planetary gear structure comprising a sun gear, a planet gear, and an internal gear, lever means separate from said movable member and engageable therewith, said lever means operable to move said movable member in the opposite direction, said lever means being pivoted on the shaft of said sun gear and being connected to said planet gear for pivotal movement thereby, means engageable with said internal gear and operable to restrain the same from movement thereby to cause said planet gear to rotate about said sun gear upon rotation of said sun gear, electric driving means for rotating said sun gear, means to render said engageable means effective upon energization of said driving means and ineffective upon deenergization of said driving means, said biasing means being operable to act through said movable member to return said lever means and said planet gear to their initial position relative to said sun gear upon deenergization of said driving means, and means to stop further rotary movement of said planet gear about said sun gear upon predetermined movement of said movable member in the opposite direction.

9. In an automatically operated valve, a valve member having a valve stem with an abutment thereon, an operating lever having a cam surface engageable with said abutment and operable upon pivotal movement to move said valve stem, said cam surface having a first portion operable to cause initial opening movement of said valve to be at a predetermined high rate of speed and a second portion operable to cause subsequent movement to be at a predetermined lower rate of speed, electric driving means to move said lever, operating means including a gear mechanism for transmitting movement from said driving means to said lever, electromagnetic means connected to be energized only when said driving means is energized operable upon energization of said driving means to effect a driving engagement of said driving means and said operating means, said electromagnetic means being operable upon deenergization of said driving means to release said operating means from said driving engagement, and means biasing said valve stem in one direction, said biasing means being operable to act through said valve stem to move said lever to its initial position relative to the abutment on said valve stem upon release of said operating means.

10. In an automatically operated valve, a valve member having a valve stem with an abutment thereon, an operating lever having a cam surface engageable with said abutment and operable upon pivotal movement to move said valve stem, said cam surface having a first portion operable to cause initial opening movement of said valve to be at a predetermined high rate of speed and a second portion operable to cause subsequent movement to be at a predetermined lower rate of speed, electric driving means to move said lever, operating means including a gear mechanism for transmitting movement from said driving means to said lever, electromagnetic means connected to be energized only when said driving means is energized operable upon energization of said driving means to effect a driving engagement of said driving means and said operating means, said electromagnetic means being operable upon deenergization of said driving means to release said operating means from said driving engagement to permit said lever to move to a valve closed position, a spring cooperable with said valve stem and urging the same toward valve closed position, said spring being operable to rotate said lever to valve closed position against the frictional resistance of said operating means when released from said driving engagement, and the force of said spring being so related to the frictional resistance of said operating means as to effect a valve closing movement at a predetermined rate.

11. In an automatically operated valve, a valve member having a valve stem with an abutment thereon, an operating lever having a cam surface engageable with said abutment and operable upon pivotal movement to move said valve stem, said cam surface having a first portion operable to cause initial opening movement of said valve to be at a predetermined high rate of speed and a second portion operable to cause subsequent movement to be at a predetermined lower rate of speed, electric driving means to move said lever, a gear train including a sun gear, planet gear and internal gear for transmitting movement from said driving means to said lever, a braking means in operative relation with said internal gear, electromagnetic means connected to be energized only when said driving means is energized and operable upon energization of said driving means to effect engagement of said braking means and said internal gear, said electromagnetic means being operable upon de-energization of said driving means to release said braking means from said internal gear and biasing means biasing said valve stem against movement by said operating lever to operate to restore said operating lever and said valve stem to their initial positions upon release of said braking means.

12. In an automatically operated valve, a valve member having a valve stem with an abutment thereon, an operating lever having a cam surface engageable with said abutment and operable upon pivotal movement to move said valve stem, said cam surface having a first portion operable to cause initial opening movement of said valve to be at a predetermined high rate of speed and a second portion operable to cause subsequent movement to be at a predetermined lower rate of speed, electric driving means to move said lever, operating means including a gear train comprising a sun gear, planet gear and internal gear for transmitting movement from said driving means to said lever, braking means in operative relation with said internal gear, electromagnetic means connected to be energized only when said driving means is energized and operable upon energization of said driving means to cause engagement of said braking means and said internal gear to effect a driving engagement of said driving means and said operating means, said electromagnetic means being operable upon deenergization of said driving means to release said braking means from said driving engagement to permit said lever to move to a valve closed position, a spring cooperable with said valve stem and urging the same toward valve closed position, said spring being operable to rotate said lever to valve closed position against the frictional resistance of said operating means when released from said driving engagement, and the force of said spring being so related to the frictional resistance of said operating means as to effect a valve closing movement at a predetermined rate.

References Cited in the file of this patent

UNITED STATES PATENTS

| | | |
|---|---|---|
| 1,888,274 | Kuhn | Nov. 2, 1932 |
| 1,901,397 | Kuhn | Mar. 14, 1933 |
| 2,052,929 | Kronmiller | Sept. 1, 1936 |
| 2,086,030 | Hodgson | July 6, 1937 |
| 2,195,219 | McGoldrick | Mar. 26, 1940 |
| 2,203,613 | Cyr | June 4, 1940 |
| 2,280,062 | Craig | Apr. 21, 1942 |
| 2,333,848 | DiVette | Nov. 9, 1943 |
| 2,354,562 | Webb | July 25, 1944 |
| 2,397,068 | Wilson | Mar. 19, 1946 |
| 2,420,553 | Morrill | May 13, 1947 |
| 2,482,568 | Werner | Sept. 20, 1949 |